United States Patent
Rossol et al.

(10) Patent No.: US 10,867,562 B2
(45) Date of Patent: Dec. 15, 2020

(54) IMAGE CREATION AND ASSESSMENT METHOD AND SYSTEM

(71) Applicant: VARAFY CORPORATION, Edmonton (CA)

(72) Inventors: Nathaniel Rossol, Edmonton (CA); Osmar Zaiane, Edmonton (CA)

(*) Notice: Subject to any disclaimer, the term of this patent is extended or adjusted under 35 U.S.C. 154(b) by 35 days.

(21) Appl. No.: 16/140,273

(22) Filed: Sep. 24, 2018

(65) Prior Publication Data
US 2019/0103061 A1  Apr. 4, 2019

Related U.S. Application Data

(60) Provisional application No. 62/565,259, filed on Sep. 29, 2017.

(51) Int. Cl.
| | | |
|---|---|---|
| G09G 3/34 | (2006.01) | |
| G06K 9/00 | (2006.01) | |
| G06T 11/20 | (2006.01) | |
| G06T 7/00 | (2017.01) | |
| G06K 9/62 | (2006.01) | |
| G02F 1/13357 | (2006.01) | |
| G06F 1/16 | (2006.01) | |

(52) U.S. Cl.
CPC ..... *G09G 3/3406* (2013.01); *G02F 1/133602* (2013.01); *G06F 1/1605* (2013.01); *G06K 9/00* (2013.01); *G06K 9/00483* (2013.01); *G06K 9/6255* (2013.01); *G06T 7/0002* (2013.01); *G06T 11/206* (2013.01); *G06T 2207/30168* (2013.01)

(58) Field of Classification Search
None
See application file for complete search history.

(56) References Cited

U.S. PATENT DOCUMENTS

2012/0288845 A1* 11/2012 Kumar GL ............... G09B 7/06
434/362

* cited by examiner

*Primary Examiner* — Dov Popovici
(74) *Attorney, Agent, or Firm* — Bennett Jones LLP

(57) ABSTRACT

A software-based method and system enables the creation and automatic assessment of an image such as a free-body diagram by adding pre-made or user-created components to create the image. The input to the software may be a vectorized entity representation of constituent elements of a user's submitted image, including element properties. A pre-authored correct solution and a grading rubric may be used to compute a grade to be returned to the user as output. The assigned grade can be proportional to the severity of any errors in accordance with the grading rubric. The method and system may also generate feedback to the user indicating where and why grade points were lost.

22 Claims, 6 Drawing Sheets

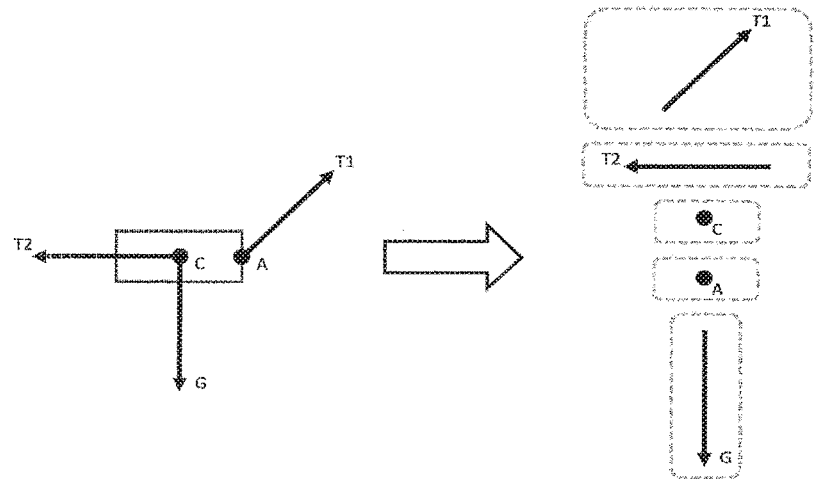

FIG. 4

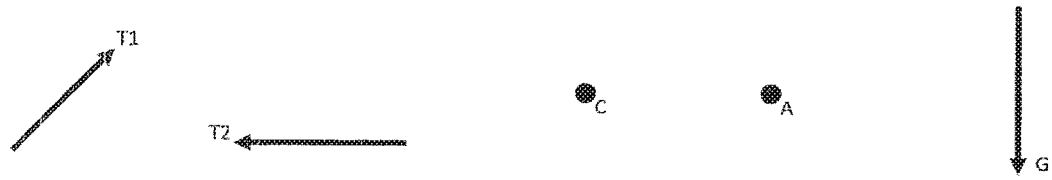

Properties:

| Type: vector | Type: vector | Type: point | Type: point | Type: vector |
| Label: T1 | Label: T2 | Label: C | Label: A | Label: G |
| Rotation: 45 | Rotation: 180 | X: 0 | X: 20 | Rotation: 270 |
| Attached to: A | Attached to: C | Y: 0 | Y: 0 | Attached to: C |

JSON Code:

```
{                    {                    {                    {                    {
  "type": "vector",    "type": "vector",    "type": "point",     "type": "point",     "type": "vector",
  "label": "T1",       "label": "T2",       "label": "C",        "label": "A",        "label": "G",
  "rotation": 45,      "rotation": 180,     "x": 0,              "x": 20,             "rotation": 270,
  "attachedTo": "A"    "attachedTo": "C"    "y": 0               "y": 0               "attachedTo": "C"
}                    }                    }                    }                    }
```

FIG. 5

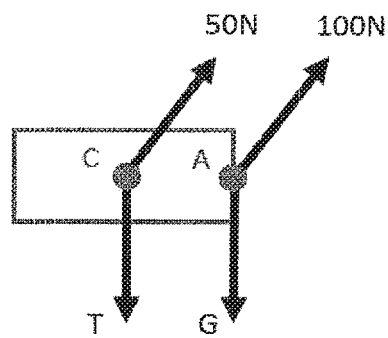
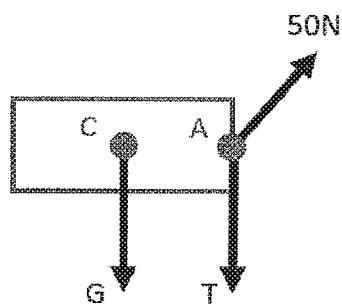
FIG. 6
| | | Correct Answer Image Elements | | |
|---|---|---|---|---|
| | | 1 | 2 | 3 |
| Submitted Image Elements | 1 | 1.5 | 3.5 | 2.0 |
| | 2 | 1.0 | 2.0 | 3.5 |
| | 3 | 3.5 | 1.5 | 1.0 |
| | 4 | 2.0 | 1.0 | 1.5 |
FIG. 6A

|  | Correct Answer Image Elements | | |
|---|---|---|---|
|  | 1 | 2 | 3 |
| Submitted Image Elements 1 | 1.5 | 3.5 | 2.0 |
| 2 | 1.0 | 2.0 | 3.5 |
| 3 | 3.5 | 1.5 | 1.0 |
| 4 | 2.0 | 1.0 | 1.5 |

FIG. 6B

|  | Correct Answer Image Elements | | |
|---|---|---|---|
|  | 1 | 2 | 3 |
| Submitted Image Elements 1 | 1.5 | 3.5 | 2.0 |
| 2 | 1.0 | 2.0 | 3.5 |
| 3 | 3.5 | 1.5 | 1.0 |
| 4 | 2.0 | 1.0 | 1.5 |

FIG. 6C

IMAGE CREATION AND ASSESSMENT METHOD AND SYSTEM

FIELD

The present disclosure relates in general to software-based methods and systems for creating and automatically assessing an image, and relates in particular to methods and systems for creating and automatically assessing an image by adding pre-made or user-created components to create the image.

BACKGROUND

In many math, science, engineering, social sciences, business, and artistic processes, it may be necessary or desirable to create a diagram to explain a process, to depict a structure, and/or to generally aid in solving a particular problem. When students are being taught how to create such diagrams, it is typically necessary to grade the results and to provide feedback to the students. Currently, the grading and assessment of such diagrams is typically performed manually by a human instructor. This poses an issue for web-based learning and instructional settings in which it is preferable to be able to grade students' submissions automatically. Accordingly, there is a need for methods and systems for creating images and automatically assessing them.

BRIEF SUMMARY

The present disclosure teaches methods and systems for creating and automatically assessing images by adding pre-made or user-created components to create the images. In some embodiments, methods and systems in accordance with the present disclosure can be used for creating and assessing free-body diagrams ("FBDs") of the type that are commonly used in physics and engineering. In some embodiments, methods and systems in accordance with the present disclosure can be used for creating and assessing chemical diagrams and processes, and organizational and computing logic flowcharts, to name a few non-limiting examples.

In some embodiments, a software process, method, and system may be provided for automatically grading a user-created diagram. In some embodiments, this process can be used for generation and grading of physics and engineering FBDs. The input to the software can be a "vectorized" entity representation of a student's submission, meaning (for purposes of this patent document) a conversion of the student's submission into a series of simplified drawing subcomponents or building blocks, such (by way of non-limiting example) circles, polygons, and/or other shapes or symbols.

In some embodiments, a pre-authored correct solution and marking scheme (alternatively referred to herein as a "grading rubric") can be used to compute a grade that can be returned to the student as output. The assigned grade can be proportional to the severity or significance of any errors in accordance with what is specified in the grading rubric. In addition to the grade output, the method and system can also generate feedback to the student describing exactly where every grade point (or partial grade point) was lost.

In some embodiments, the method and system can also recognize multiple valid ways to interpret mistakes made in a student's submission. To promote or ensure consistency and fairness, the method and system may compute an interpretation that preserves the most grade points (i.e., the interpretation or set of interpretations that are not only accurate, but which also will not excessively or unreasonably penalize a student's mistakes). This is challenging objective, because if a submitted diagram has n number of different elements, there will be a total of n! (i.e., n factorial) ways to match a student's submission elements to the solution elements. This quickly becomes unscalable for problems having close to 10 elements or more (which are common), and makes larger, more complex diagrams ungradable in "real-time" (which for purposes of this patent document means gradable in less than approximately one second). However, in some embodiments, the methods and systems described herein can find the mathematically guaranteed optimal interpretation of a student's submission in the order of $n^4$ actions instead, making it possible to operate in real-time even for very large and complex diagrams.

In some embodiments, methods and systems in accordance with the present disclosure may assess FBDs for both statics and dynamics, where users (e.g., students) use vectors, moments, and point components to construct their diagram(s). The method and system can be used in cases where some of the diagram components (e.g., points) are pre-supplied to the user (student), and where a background image (for example, an outline of a truss or a support member) may also be provided. The number of grade points deducted for each type of mistake can be configured through the grading rubric, and the assessment process can automatically adjust its grading behavior accordingly.

Accordingly, in a first aspect the present disclosure teaches a method for assessing a proposed diagram ("Diagram A") against a ground-truth diagram ("Diagram B"), comprising the steps of:
  converting the Diagram A to a first entity list, and converting the Diagram B to a second entity list;
  computing a cost matrix using the first entity list, the second list, and a costs list; and
  computing an optimal matching score for the Diagram A relative to the Diagram B using the cost matrix.

Optionally, the method may further comprise any one or more of the following steps:
  identifying one or more elements in the Diagram A to create the first entity list;
  identifying one or more elements in the Diagram B to create the second entity list;
  storing either or both of the first and second entity lists in an .XML file format or in a .JSON file format;
  identifying at least one property associated with the one or more identified elements;
  encoding the location of the one or more identified elements;
  using either or both of an Optimal Weighted Bipartite Matching technique and a Munkres Assignment Algorithm to compute the optimal matching score; and
  providing feedback with respect to the Diagram A using the optimal matching score.

In a second aspect, the present disclosure teaches a system for assessing a proposed diagram ("Diagram A") against a ground-truth diagram ("Diagram B"), comprising:
  means for converting the Diagram A to a first entity list, and for converting the Diagram B to a second entity list;
  means for computing a cost matrix using the first entity list, the second entity list, and a costs list; and
  means for computing an optimal matching score for the Diagram A relative to the Diagram B using the cost matrix.

Optionally, the system may further comprise any one or more of the following features:

- means for identifying one or more elements in the Diagram A to create the first entity list, and one or more elements in the Diagram B to create the second entity list;
- means for storing either or both of the first entity list and the second entity list in an .XML file format or in a JSON file format;
- means for identifying at least one property associated with the one or more identified elements;
- means for encoding the location of the one or more identified elements;
- means for using either or both of an Optimal Weighted Bipartite Matching technique and a Munkres Assignment Algorithm to compute the optimal matching score; and
- means for providing feedback on the Diagram A using the optimal matching score.

In a third aspect, the present disclosure teaches a method for assessing a proposed diagram ("Diagram A") against a ground-truth diagram ("Diagram B"), in which:

- the method is embodied on a computer-readable medium such that, when implemented on a computer, the method can assess the Diagram A against the Diagram B; and
- the computer-readable medium comprises:
  - a code segment configured to convert the Diagram A to a first entity list, and to convert the Diagram B to a second entity list;
  - a code segment configured to compute a cost matrix using the first entity list, the second entity list, and a costs list; and
  - a code segment configured to compute an optimal matching score for the Diagram A relative to the Diagram B using the cost matrix.

Optionally, the computer-readable medium may further comprise any one or more of the following features:

- a code segment configured to identify one or more elements in the Diagram A to create the first entity list, and one or more elements in the Diagram B to create the second entity list;
- a code segment configured to store either or both of the first and second entity lists in an .XML file format or in a .JSON file format;
- a code segment configured to identify at least one property associated with the one or more identified elements;
- a code segment configured to encode the location of the one or more identified elements;
- a code segment configured to use either or both of an Optimal Weighted Bipartite Matching technique and a Munkres Assignment Algorithm to compute the optimal matching score; and
- a code segment configured to provide feedback with respect to the Diagram A using the optimal matching score.

In alternative embodiments of this method;

- the one or more identified elements may include one or more vectors, moments, and points;
- the location of the one or more identified elements may be encoded in accordance with either or both of an absolute canvas location and a connection information;
- the at least one identified property associated with the one or more identified elements may include any one or more of a rotation angle, an (x,y) position, an "attachedTo" property, and a distance calculation; and
- the costs list may comprise a list of mismatches between the Diagram A and the Diagram B.

BRIEF DESCRIPTION OF THE DRAWINGS

Embodiments will now be described with reference to the accompanying Figures, in which numerical references denote like parts, and in which:

FIG. 4 is a block diagram depicting the breaking down of a sample diagram into discrete elements.

FIG. 5 is a block diagram depicting element descriptions corresponding to the sample diagram in FIG. 4, written in a .JSON file format.

FIG. 6 is a block diagram depicting a comparison between a submitted answer and a correct answer with respect to the sample diagram in FIG. 4.

FIG. 6A illustrates an exemplary cost matrix relating to the correct answer depicted in FIG. 6.

FIG. 6B illustrates an exemplary cost bipartite matching with respect to the submitted answer and correct answer depicted in FIG. 6.

FIG. 6C illustrates an optimal matching with respect to the submitted answer and correct answer depicted in FIG. 6.

DESCRIPTION

Figure 1:
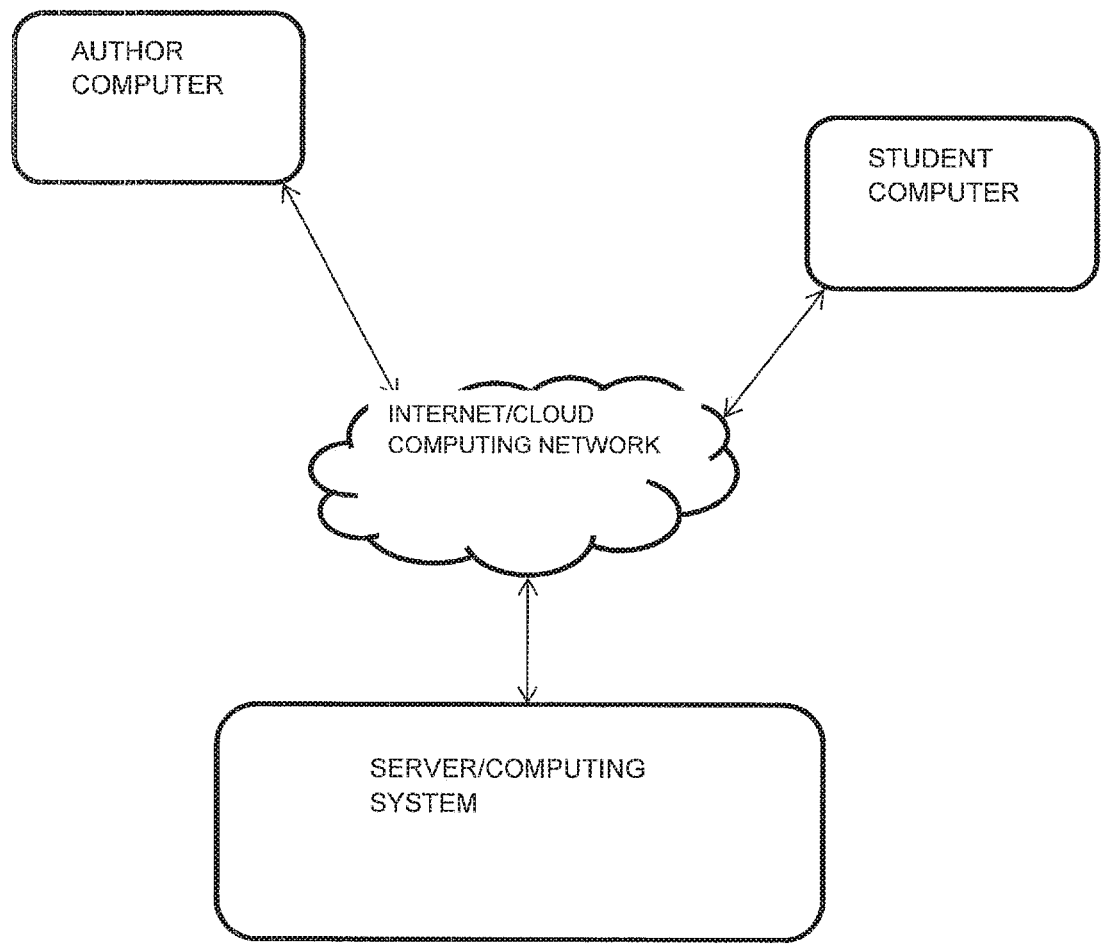
FIG. 1 is a block diagram depicting one embodiment of system for an automatic figure assessment method.

FIG. 1 illustrates one embodiment of a system for carrying out methods in accordance with the present disclosure. In some embodiments, the system may comprise an author's computer or other computing device that may be coupled to a server/computing system via an internet or cloud-based computing network. Similarly, a student's computer may be coupled to the server/computing system via the internet or cloud-based computing network.

Figure 2:
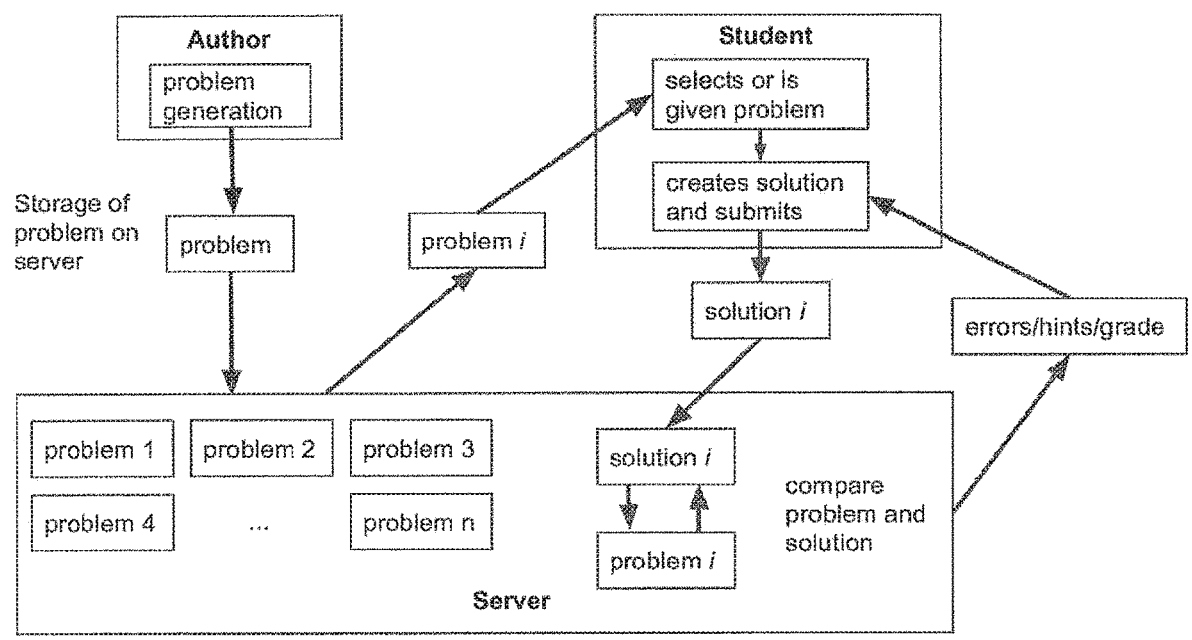
FIG. 2 is a block depicting one embodiment of a process flow of the system of FIG. 1.

As illustrated in FIG. 2, in some embodiments an author may create or generate a problem using software-based tools on an internet browser application running on the author's computer or other computing device, and then upload that problem to a server via a telecommunications network, where it can be stored for recall by a student. Similarly, a student can download a problem from the server over the telecommunications network to his or her computer or other computing device to create a solution to the problem on an internet browser application. The student can then upload his or her solution to the server, where the student's solution can be analyzed and compared to the problem and to an ideal, preferred, or best solution to the problem. Upon completion of the analysis, a report can be sent to the student over the telecommunications network, providing feedback to the student as to any errors in the submitted solution, hints for correctly solving the problem, and/or a grade or mark for the submitted solution.

Figure 3:
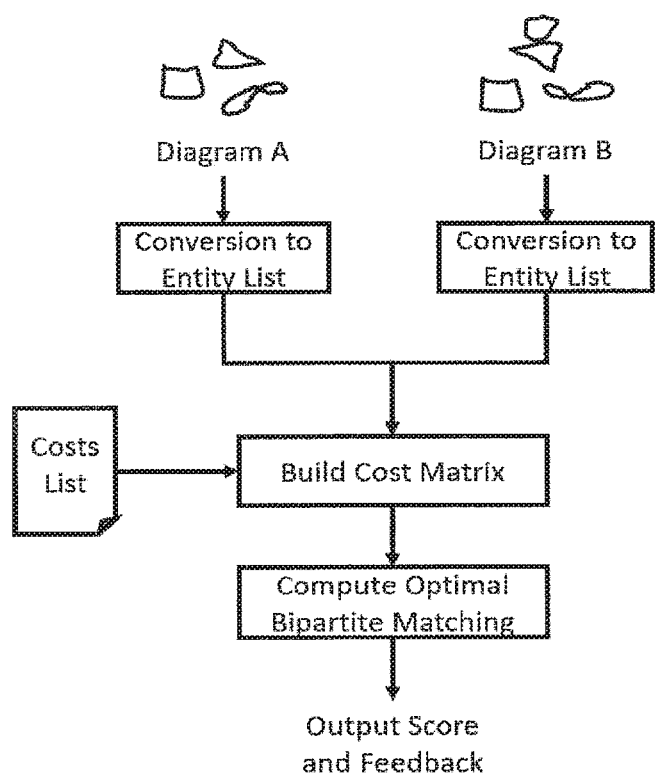
FIG. 3 is a flowchart depicting the steps of one embodiment of an automatic figure assessment method in accordance with the present disclosure.

FIG. 3 is a flowchart for an exemplary embodiment of a method in accordance with the present disclosure for automatic assessment of a proposed diagram (i.e., Diagram A) against a ground-truth diagram (Diagram B), involving the following steps:

1. Converting the Diagram A and the Diagram B to respective entity lists of discrete image elements having discrete properties, wherein each entity list can describe each of the basic graphical elements (or "primitives") of its respective diagram.
2. Computing a "Cost Matrix" (as described below) for the Diagram A and the Diagram B by using the entity lists and a costs list. (As used in this patent document, the term "costs list" refers to a pre-determined marking guide setting out a specific number of points to be deducted from a student's score or grade for each mismatching of the elements of a diagram and/or their properties.) The Cost Matrix can compile the differences between the submitted and intended elements and their properties.
3. Using the Cost Matrix to compute an Optimal Bipartite Matching (as discussed later herein) between the Diagram A and the Diagram B, wherein the optimal matching can result in the minimum number of grade points deducted.
4. Using the optimal matching to provide feedback to the student, and to give a final mark or grade.

Image Component Breakdown into an Entity List

In some embodiments in accordance with the present disclosure, the first step in the automatic assessment of an image may comprise breaking down the image into a set of discrete elements. For example, a physics FBD might be broken down into a set of vector, moment, and point elements. Each element may comprise a variety of properties—for example, a unique name, a position, an orientation, a scale, and a list of the unique names of other elements to which it is connected. An example of a diagram being broken down into its constituent components or elements is shown in FIG. 4. The rectangular background image in FIG. 4 could be considered a constituent component, but not necessarily.

In embodiments where diagrams are authored using a diagram-drawing tool that allows only three or four image types (for example, vectors, points, and moments), then no image-recognition step would be required, and the components can be converted to an entity list directly.

The example image in FIG. 4 contains a background image (i.e., an outline of a grey box to which forces are being applied). In some embodiments, the methods and systems disclosed herein may support the display of background image data (for example, images in file formats such as, but not limited to .jpg, .png, gif, .svg). The background image data may comprise any arbitrary image, and in some embodiments would not be encoded into a different data format, because in some circumstances it might not be relevant to the diagram assessment process. In such cases, though, such background image data optionally may be provided by the question author to guide or assist users (students) as they draw and compose their diagrams.

In some embodiments, all diagrams may be represented as a list of discrete graphical elements with various properties. This entity list can be stored in a single .XML[1] or .JSON[2] file format or any other suitable format known to persons skilled in the art. One non-limiting example of how the image components of FIG. 4 could be converted into the JSON data format is shown in FIG. 5.

[1]Extensible markup language.
[2]JavaScript Object Notation.

In some embodiments, only the features that are relevant to image assessment need to be encoded into the data storage format. In some embodiments, other information could be included and used for other purposes if desired. In some embodiments, the actual visual appearance of the object can be discarded, and instead replaced with a text label for the type of the object (e.g., "vector", "moment", or "point").

For numerical properties such as rotation angles or (x,y) positions (i.e., planar co-ordinates), the values can be rounded, based on criteria provided in a configuration file. For example, setting "rotationRounding":5 in a JSON-formatted config.json file could indicate to the software that all rotation values should be rounded to the nearest five degrees. Other types of encoding can be used to store similar information.

Encoding Image Element Positions

In some embodiments, the encoding of the location of an image element can be performed in a variety of formats, such as (by way of non-limiting example): i) absolute canvas position; and ii) connection information. In some embodiments, the absolute canvas position can comprise an (x,y) pair indicating where the picture element is located in terms of the number of pixels horizontally and vertically from a prescribed reference position of the drawing canvas.

In other embodiments, a picture element can comprise an attachment property (e.g., "attachedTo") that provides the names of any other picture elements that it is connected to (i.e., touching). The distance (in pixels) within which image elements must be in order to count as touching can be stipulated in a configuration file. If a particular image element can only be attached to one other element at most, the closest touching element can be selected. The distance calculation may be based on an agreed-upon convention, such as object-centroid-to-object-centroid, object-edge-to-object-edge, or any other suitable convention for determining a distance between objects. In some embodiments, the distance calculation may be based on the distance from the center of the image element, or from an edge segment or a vertex or endpoint (in the case of images of vector arrows, for example).

In some embodiments, the distance (in pixels) within which an image element must be in order to count as being placed correctly for absolute (x,y) values can also be stipulated in the configuration file. For example, setting a value such as "minPointDistanceError":20 in a config.JSON file could indicate that points with absolute (x,y) pixel values must be within 20 pixels of the ground-truth location to count as being placed correctly. In the example of physics FBDs, it may be beneficial in some embodiments to specify point locations using absolute (x,y) canvas positions, and to specify vectors and moments using only attachment information.

In some embodiments, it is possible for a proposed assignment problem to pre-supply several image elements to use as a starting point (in addition to the background image). As an example, a kinematics physics problem could pre-supply a background image, with all of the important points being displayed on the diagram. The student could then be tasked with correctly drawing or labelling vectors and moments onto the existing diagram. In a more advanced configuration, the student could be further tasked with providing a sketch of both the relevant background image and the attachment points.

In some embodiments, image element labels (such as vector names or point names) could be properties of the image elements, rather than being considered as separate image elements. In the case of physics FBDs, it may be useful, for whatever diagram-authoring tool is being used, to stipulate that each image element has at most one text label associated with it.

Comparing Image Components

In some embodiments, the automated grading algorithm can accept two entity lists as input (typically, a student's proposed diagram and an instructor's answer key diagram), and can then assign a mark or grade based on the differences found between the two entity lists. The grading process can be accomplished through a pre-configured costs list (i.e., points to be deducted for mismatches between component properties).

In the sample problem in FIG. 4, the student must draw a physics FBD based on a textual description (not shown). For this particular example, in addition to the background image of the grey box, the question author has also pre-supplied two image components, namely points A and C. As a result, this particular sample problem only requires the student to draw several labelled force vectors onto the image (using the pre-supplied points and background image to guide the location placement). The four force vectors drawn by the student in the submitted answer (as shown on the left side of FIG. 6) could be converted into JSON code as follows:

```
{ diagramElementList: [
{"type": "vector","label": "50N","rotation": 60,"attachedTo": "C"},
{"type": "vector","label": "100N","rotation": 60,"attachedTo": "A"},
{"type": "vector","label": "T","rotation": 270,"attachedTo": "C"},
{"type": "vector","label": "G","rotation": 270,"attachedTo": "A"},
]}
``` whereas the correct answer (as shown on the right side of FIG. 6) could be pre-encoded in JSON format as follows:

```
{ diagramElementList: [
{"type": "vector","label": "50N","rotation": 60,"attachedTo": "A"},
{"type": "vector","label": "T","rotation": 270,"attachedTo": "A"},
{"type": "vector","label": "G","rotation": 270,"attachedTo": "C"},
]}
```

In some embodiments, the order of the image elements within these lists might not be important, as it might not have any special meaning for purposes of assessment. In such cases, assessment of the student's score can be accomplished by directly comparing the list of image components for the submitted diagram against the pre-authored correct answer diagram image element list, and deducting points for relevant mis-matches between the two lists.

In some embodiments, part of this procedure could include providing a costs list for each possible mistake (i.e., how many points should be deducted from a student's grade for each possible mistake). By way of example for the sample problem above, the question author might choose to deduct 2 points for a vector that is completely missing, 2 points for an extra (unnecessary) vector, 1 point for a vector that is mislabelled, 1.5 points for a vector that is attached to the wrong point, and 1 point for a vector that is at the wrong orientation. This data could be encoded into a JSON question configuration file as follows:

```
{ "missingVectorCost": 2, "extraVectorCost": 2,"wrongVectorLabelCost": 1, "wrongVectorAttachmentCost": 1.5, "wrongVectorRotationCost": 1}
```

In some embodiments, if the sample problem permits the placement of additional types of image elements (such as points or moments, for example), the costs associated with additional image elements can be added to the question configuration file. If a specific property or difference is unimportant for grading purposes, its cost for a mismatch could be set as zero in some embodiments.

Cost Matrix

Using a costs list, image elements can now be directly compared, and a cost matrix can be computed. A cost matrix is a way of organizing the comparison of each image entity of the submitted image (Diagram A) to the correct answer image (Diagram B). To determine the cost for matching two image elements, all of their properties are compared, and grade point deductions are summed up for each mismatched property.

In the previous example, the first submitted image element can be defined as:
{"type": "vector","label": "50N","rotation": 60,"attachedTo": "C"}
and the first image element from the correct answer can be defined as:
{"type": "vector","label": "50N","rotation": 60,"attachedTo": "A"}
The only difference between these two image elements is the "attachedTo" property. According to the example costs list from before, this can result in a point deduction of 1.5.

As another example, the second submitted image element can be:
{"type": "vector","label": "100N","rotation": 60,"attachedTo": "A"}
and the third image element from the correct answer can be:
{"type": "vector","label": "G","rotation": 270,"attachedTo": "C"}
These two image elements have three properties that differ (i.e., different labels, rotation, and attachment points), which can lead a point cost of (1.0+1.0+1.5)=3.5 for mismatching these two image elements.

In some embodiments, the cost matrix can be the two-dimensional (2D) array of cost values that results from comparing every image element in the submitted answer to every image element in the correct answer. Using the example cost values from before, the resulting cost matrix for the example problem would be as illustrated in FIG. 6A.

In some embodiments, the costs in the cost matrix can be any positive value, including zero. For example, if two image components have exactly identical properties, their resulting matching cost would be zero.

Using the computed cost matrix, an optimal bipartite matching between the submitted image elements and the correct answer image elements can now be computed.

Computing an Optimal Matching

In some embodiments, the final step can be to determine the matching between the elements in the submitted diagram and the solution diagram. While this could be solved by a "brute force" method that would require n! (i.e., n factorial) steps, where n is the number of elements, this can be prohibitive for a large number of elements, as previously noted. Instead, an optimal matching technique known as "Optimal Weighted Bipartite Matching" can be employed.

The problem is known more commonly in the field of computational mathematics as the "Assignment Problem". In some embodiments, the optimal matching can comprise a list of pairs of elements between the submitted diagrams and the solution diagrams, where the sum of all the cost lists from each pairing can be the absolute minimum possible (i.e., each entity can be paired only once). In some embodiments, this can be equivalent to finding the best matching between the submitted image elements and the solution elements that results in the fewest grade points being deducted.

Computing an optimal weighted bipartite matching from a cost matrix is a well-studied problem in computing science. In some embodiments, to find a bipartite matching from a 2D cost matrix, one can choose a single cell from each column of the matrix such that no two cells share the same row. In the case of a matrix having more columns than rows, the matrix can first be transposed (i.e., the rows and columns are exchanged).

In some embodiments, the process of computing the optimal weighted matching from the cost matrix may comprise computing the cost for every possible matching. However, in the case of a large number of image elements, this can take too many steps to complete in real-time. In some embodiments, a weighted bipartite matching algorithm, such as the Munkres Assignment Algorithm (a modified version of the original Hungarian Algorithm), can be used for the step of computing the optimal matching from the 2D cost matrix.

Having reference to the previous example, one possible bipartite matching between the submitted elements and solution elements could be:

(2,1), (3,2), (4,3)

as illustrated in FIG. 6B.

This is equivalent to indicating that the second vector element submitted by the student should be matched with the first element in the solution (i.e., 1.0 points would be deducted because the student set the label as "100N" instead of "50N"). It also indicates that 1.5 points should be deducted for each of the vectors labelled "T" and "G" in the student's solution, because the student attached them to the wrong points. This results in a total of 4.0 points being deducted for all of the mistakes. An additional 2.0 points can be deducted for having one extra vector (image element 1) that went unmatched.

However, this matching scheme is not optimal, and in fact it deducts too many points from the student's submission. The optimal matching is actually:

(2,1), (4,2), (3,3)

as illustrated in FIG. 6C.

In this case, the student's mistakes with respect to the vectors T and G are re-interpreted as vectors that are correctly placed but mislabelled. Because the cost for mislabelled vectors is lower than the cost for misplaced vectors, the costs list for the optimal matching is only 3.0 (with an additional 2.0 points being deducted for the extra vector, image element 1).

In some embodiments, comparisons of components can be permitted only for components of the same type. For example, it is not meaningful to compare vectors to moments or points, because their properties lists are fundamentally different (as shown in FIG. 6). In some embodiments, each type of image element can only be compared with elements of the same type, meaning that a separate cost matrix and analysis can be done for each image element type.

Output of Feedback

In some embodiments, once the matching has been computed, each mismatched pair (i.e., missing entity or improper entity property) can be used to generate feedback to the student. The feedback function can take an image element pairing, and can then output a comment (i.e., test string) for every instance in which the properties differ. This test string can indicate the number of points deducted and the reasons for the deductions.

The various illustrative logical blocks, modules, circuits, and algorithm steps described in connection with the embodiments disclosed herein may be implemented as electronic hardware, computer software, or a combination of both. To clearly illustrate this interchangeability of hardware and software, various illustrative components, blocks, modules, circuits, and steps have been generally described herein in terms of their functionalities. Whether a given functionality is implemented as hardware or software in a given case will depend upon the particular application and design constraints imposed on the overall system. Skilled artisans may implement a described functionality in varying ways to suit particular applications, but such implementation decisions should not be interpreted as constituting a departure from the scope of the present disclosure.

Embodiments implemented in computer software may be implemented in software, firmware, middleware, microcode, hardware description languages, or any combination thereof. A code segment or machine-executable instruction may represent a procedure, function, subprogram, program, routine, subroutine, module, software package, class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, and/or transmitted via any suitable means including memory sharing, message passing, token passing, and/or network transmission.

The actual software code or specialized control hardware used to implement embodiments of systems and methods in accordance with the present disclosure is not limiting with respect to the intended scope of such embodiments. Accordingly, the operation and behavior of systems and methods in accordance with the present disclosure have been described herein without reference to the specific software code, as it will be readily understood by persons skilled in the art that software and control hardware can be designed to implement systems and methods in accordance with the present disclosure based solely on the present disclosure and common general knowledge in the art, without departing from the scope of the present disclosure.

When implemented in software, functionalities may be stored as one or more instructions or code on a non-transitory computer-readable or processor-readable storage medium. The steps of a method or algorithm in accordance with the present disclosure may be embodied in a processor-executable software module, which may reside on a computer-readable or processor-readable storage medium. For purposes of this patent document, non-transitory computer-readable or processor-readable media include both computer storage media and tangible storage media that facilitate transfer of a computer program from one place to another. Non-transitory processor-readable storage media may be any available media that may be accessed by a computer. By way of non-limiting example, such non-transitory processor-readable media may comprise RAM, ROM, EEPROM, CD-ROM, or other optical disk storage; magnetic disk storage or other magnetic storage devices; or any other tangible storage medium that may be used to store desired program code in the form of instructions or data structures and that may be accessed by a computer or processor.

The terms "disk(s)" and "disc(s)", as used herein, include compact discs (CDs), laser discs, optical discs, digital versatile discs (DVDs), floppy disks, and Blu-ray discs, (with the distinction between "disks" and "discs" being that "disks" usually reproduce data magnetically, whereas "discs" reproduce data optically with lasers). Combinations of the above are also to be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

In this patent document, references to "one embodiment", "an embodiment", or "embodiments" denote that the feature or features being referred to are included in at least one embodiment in accordance with the present disclosure. Separate references herein to "one embodiment", "an embodiment", or "embodiments" do not necessarily refer to the same embodiment and also are not mutually exclusive, unless so stated or otherwise readily apparent to those skilled in the art based on the present disclosure. For example, a feature, structure, step, or act described in one embodiment may also be included in other embodiments, but not necessarily. Accordingly, embodiments in accordance with the present disclosure may include a variety of combinations and/or integrations of the embodiments described herein.

Although a number of embodiments are illustrated and described herein, it will be appreciated by those skilled in the art that various changes and modifications can be made to these embodiments without changing or departing from the intended scope of the illustrated and described embodiments, or from the scope of the present disclosure as a whole. All terms and expressions used in this patent document are used as terms of description and not of limitation, and there is no intention in the use of such terms and expressions to exclude equivalents of any features shown and described or portions thereof.

In this patent document, any form of the word "comprise" is to be understood in its non-limiting sense to mean that any element or feature following such word is included, but elements or features not expressly mentioned are not excluded. A reference to an element or feature by the indefinite article "a" does not exclude the possibility that more than one such element or feature is present, unless the context clearly requires that there be one and only one such element or feature. Wherever used in this document, the terms "typical" and "typically" are to be interpreted in the sense of being representative of common usage or practice, and are not to be understood as implying invariability or essentiality.

What is claimed is:

1. A computer-implemented method for assessing a proposed diagram Diagram A against a ground-truth diagram Diagram B, said method comprising the steps of:
    (a) converting the Diagram A to a first entity list comprising a plurality of first graphical elements, and converting the Diagram B to a second entity list comprising a plurality of second graphical elements;
    (b) computing, a cost matrix comprising cost values for pairings of one of the first graphical elements of the first entity list with one of the second graphical elements of the second entity list, wherein each cost value comprises a sum of point deductions assigned, in accordance with a costs list, to at least one mismatch between at least one property of the one of the first graphical elements and at least one property of the one of the second graphical elements; and
    (c) computing an optimal matching score for the Diagram A relative to the Diagram B using the cost matrix, wherein the optimal matching score corresponds to a minimum sum of the cost values for a combination of the pairings in which either all of the first graphical elements are paired with different ones of the second graphical elements, or all of the second graphical elements are paired with different ones of the first graphical elements.

2. The method as in claim 1, further comprising the steps of identifying one or more of the first graphical elements in the Diagram A to create the first entity list, and identifying one or more of the second graphical elements in the Diagram B to create the second entity list.

3. The method as in claim 2, wherein the one or more of the identified first or second graphical elements comprise one or more elements selected from a group consisting of vectors, moments, and points.

4. The method as in claim 2, further comprising the step of storing either or both of the first entity list and the second entity list in an .XML file format or in a .JSON file format.

5. The method as in claim 2, further comprising the step of identifying the at least one property associated with the one or more identified first or second graphical elements.

6. The method as in claim 5, further comprising the step of encoding a location of the one or more identified first or second graphical elements.

7. The method as in claim 6, wherein the location of the one or more identified first or second graphical elements is encoded in accordance with either or both of an absolute canvas location and a connection information.

8. The method as in claim 7, wherein the at least one identified property comprises one or more properties selected from a group consisting of a rotation angle, an x,y position, an attachedTo property, and a distance calculation.

9. The method as in claim 1, wherein the costs list comprises a list of specified point deductions for different types of mismatches between properties of the one of the first graphical elements and the one of the second graphical elements.

10. The method as in claim 1, further comprising the step of using either or both of an Optimal Weighted Bipartite Matching technique and a Munkres Assignment Algorithm to compute the optimal matching score.

11. The method as in claim 1, further comprising the step of providing feedback with respect to the Diagram A using the optimal matching score.

12. A computer software product comprising a non-transitory computer-readable medium storing code that is executable on a computer to implement a method for assessing a proposed diagram Diagram A against a ground-truth diagram Diagram B, wherein the method comprises the steps of:
    (a) converting the Diagram A to a first entity list comprising a plurality of first graphical elements, and to convert the Diagram B to a second entity list comprising a plurality of second graphical elements;
    (b) computing a cost matrix comprising cost values for pairings of one of the first graphical elements of the first entity list with one of the second graphical elements of the second entity list, wherein the cost value comprises a sum of point deductions assigned, in accordance with a costs list, to at least one mismatch between at least one property of the one of the first graphical elements and at least one property of the one of the second graphical elements; and
    (c) computing an optimal matching score for the Diagram A relative to the Diagram B using the cost matrix, wherein the optimal matching score corresponds to a minimum sum of the cost values for a combination of the pairings in which either all of the first graphical elements are paired with different ones of the second graphical elements, or all of the second graphical elements are paired with different ones of the first graphical elements.

13. The computer software product as in claim 12, wherein the method further comprises the steps of identifying one or more of the first graphical elements in the Diagram A to create the first entity list, and identifying one or more of the second graphical elements in the Diagram B to create the second entity list.

14. The computer software product as in claim 13, wherein the at least one of the identified first or second graphical elements comprises one or more elements selected from a group consisting of vectors, moments, and points.

15. The computer software product as in claim 13, wherein the method further comprises the step of storing either or both of the first entity list and the second entity list in an .XML file format or in a .JSON file format.

16. The computer software product as in claim 13, wherein the method further comprises the step of identifying the at least one property associated with the one or more identified first or second graphical elements.

17. The computer software product as in claim 16, wherein the method further comprises the step of encoding a location of the one or more identified first or second graphical elements.

18. The computer software product as in claim 17, wherein the location of the one or more identified first or second graphical elements is encoded in accordance with either or both of an absolute canvas location and a connection information.

19. The computer software product as in claim 18, wherein the at least one identified property comprises one or more properties selected from a group consisting of a rotation angle, an x,y position, an attachedTo property, and a distance calculation.

20. The computer software product as in claim 12, wherein the costs list comprises a list of specified point deductions for different types of mismatches between properties of the one of the first graphical elements and the one of the second graphical elements.

21. The computer software product as in claim 12, wherein the method further comprises the step of using either or both of an Optimal Weighted Bipartite Matching technique and a Munkres Assignment Algorithm to compute the optimal matching score.

22. The computer software product as in claim 12, wherein the method further comprises the step of providing feedback on the Diagram A using the optimal matching score.

* * * * *